United States Patent [19]

Grassl et al.

[11] Patent Number: 4,634,810
[45] Date of Patent: Jan. 6, 1987

[54] STATION FOR THE ACCOMMODATION OF A CHARGEABLE CORDLESS TELEPHONE

[75] Inventors: Erwin Grassl; Rudolf Waechtler, both of Munich, Fed. Rep. of Germany

[73] Assignee: Siemens Aktiengesellschaft, Berlin and Munich, Fed. Rep. of Germany

[21] Appl. No.: 674,339

[22] Filed: Nov. 23, 1984

[30] Foreign Application Priority Data

Jan. 5, 1984 [DE] Fed. Rep. of Germany ....... 3400294

[51] Int. Cl.$^4$ .............................................. H04Q 7/04
[52] U.S. Cl. ....................................... 379/61; 455/343
[58] Field of Search ................ 179/2 E, 2 EA, 2 EB, 179/2 BC, 2 EC; 455/89, 127, 343; 320/13; 340/711

[56] References Cited

U.S. PATENT DOCUMENTS

| | | | |
|---|---|---|---|
| 4,017,779 | 4/1977 | McDonald et al. | 320/15 |
| 4,143,417 | 3/1979 | Wald et al. | 364/900 |
| 4,237,540 | 12/1980 | Sato | 364/705 |
| 4,339,632 | 7/1982 | Early et al. | 179/90 B |
| 4,543,451 | 9/1985 | Schoen | 179/2 EA |
| 4,593,409 | 7/1986 | Miller | 455/73 |

Primary Examiner—Robert G. Lev
Attorney, Agent, or Firm—Hill, Van Santen, Steadman & Simpson

[57] ABSTRACT

A station for accommodation of a chargeable, cordless telephone is provided with a hollow for receiving the cordless telephone. The cordless telephone contains a cassette provided with chargeable batteries which serve to supply the current and which are charged by a corresponding charging system of the station when the telephone is inserted into the hollow. For the accommodation of a separate cassette which also contains chargeable batteries, the station is provided with a further recess in which the charging system also has access to the batteries. A separate cassette can be accommodated in the further recess of the station and kept connected to the charging system in an uninterrupted fashion, independently of use intervals and charging intervals of the cordless telephone. Thus the separate cassette is at all times available for rapid exchange with the cassette contained in the cordless telephone.

6 Claims, 2 Drawing Figures

STATION FOR THE ACCOMMODATION OF A CHARGEABLE CORDLESS TELEPHONE

BACKGROUND OF THE INVENTION

The invention relates to a stationary station serving as a base component for a location-independent, cordless telephone. The station has a trough-like hollow which is matched to the shape of the telephone. The cordless telephone contains a cassette provided with chargeable batteries which serve for feed purposes and which are charged by a corresponding system at the station when the telephone is inserted into the hollow.

Here the base component represents a station which can be connected to the telephone network and to a current supply. The cordless telephone and the base component are connected by means of modulatable, electromagnetic waves. The free mobility and ease of use of the cordless telephone is basically dependent upon a range of communication with respect to the base component.

For the wireless connection, both devices are each equipped with a transmitting and receiving device which in the base component is fed by the network terminal, and in the cordless telephone is fed by the chargeable batteries.

As a system for charging of the batteries, the base component contains a charging device and charging contacts which are accessible in the hollow and which can be contacted with contact surfaces of the battery containing cassette.

If the cordless telephone is inserted into the hollow of the base component during each of the conversation-free intervals, with normal frequency of use these intervals should be sufficient to maintain the batteries charged and ready for use.

However, for optimum use of a cordless telephone, a more extensive independence of the base component can be required. For example, it can be required that one should be reachable by telephone for several hours each day, for example at arbitrary, non-predeterminable locations at a given site. Also, one should be able to establish connections at any time from these locations. For this purpose it would be desirable to carry the cordless telephone in one's pocket.

In this case the time available for the charging of the batteries can sometimes be too short, since the telephone cannot be inserted into the base component for charging of the batteries during each of the speech intervals. Thus, in the event of insufficient battery charging, the telephone will become inoperable.

SUMMARY OF THE INVENTION

An object of the invention is to improve the independence of the cordless telephone from the base component with respect to shortening the necessary duration of action of the charging device upon the cordless telephone accommodated in the hollow of the base component.

This object is realized in accordance with the invention since in the station there is provided a further trough-like recess which serves to accommodate and to charge a separate cassette which corresponds to the contours of the cassette arranged in the cordless telephone.

A separate cassette can now be contained at any time in the recess of the station, independently of the cordless telephone, and can be exposed to the action of the charging device. In order to maintain the operability of the cordless telephone it is sufficient to periodically change the cassette. The battery cassette contained in the additional recess of the base component represents a reserve cassette.

In accordance with an advantageous further development of the invention, the recess for the reserve cassette can be formed as part of the hollow for the cordless telephone on the base surface thereof. In this case the reserve cassette is only accessible in its recess when the cordless telephone is not inserted into the hollow. When the cordless telephone and the reserve cassette are accommodated in the hollow and recess of the base component, the batteries in both the cassettes are exposed to the influence of the charging device.

In accordance with another advantageous further development of the invention, the base component can be provided with an elastic rib which is assigned to the charging contacts provided in the hollow and whose nose engages into a peripheral partition of the cordless telephone inserted into the hollow of the base component and keeps the telephone, with the contact surfaces of the battery cassette, pressed against the charging contacts in the hollow of the base component.

DESCRIPTION OF THE PREFERRED EMBODIMENTS

Figure 1:
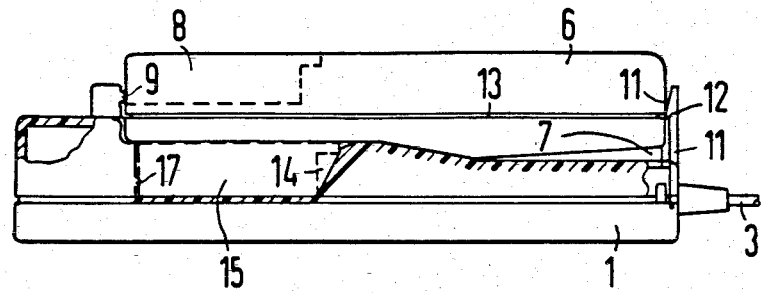
FIG. 1 represents a cordless telephone inserted into a hollow provided in the base component, in a partially cut-away side view.
Figure 2:
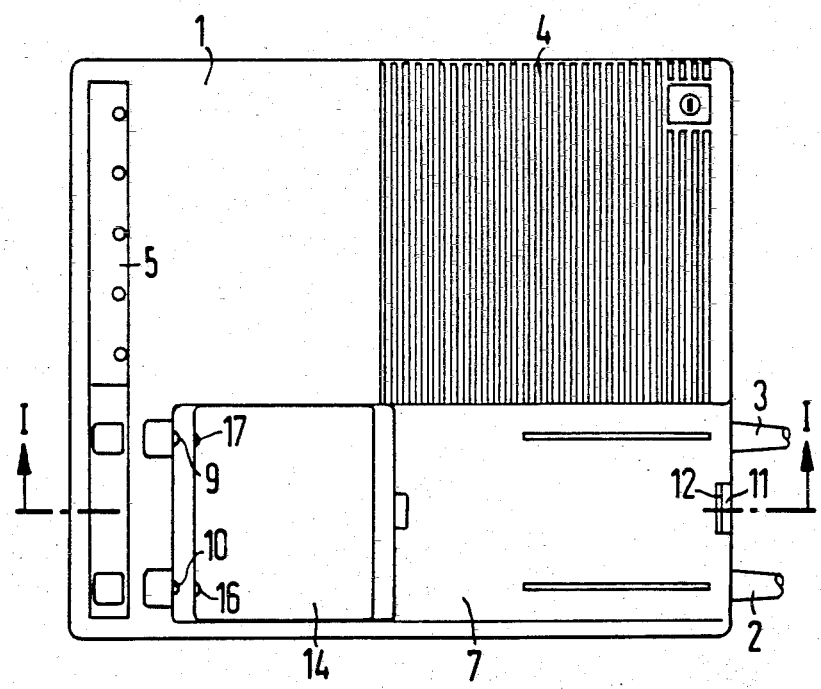
FIG. 2 is a plan view of the base component with the cordless telephone removed.

The base component 1 for the cordless telephone 6 is provided with connection cords 2, 3 for connection to the telephone network and an energy supply, and represents a complete telephone station. The upper housing surface of the base component is equipped with a sound grid or mesh 4 for the input and output of acoustic signals, with display and actuating elements 5, and with a hollow 7 whose shape is adapted to that of the cordless telephone.

The cordless telephone 6 likewise represents a complete telephone in the form of a hand-held transceiver, can be connected to the base component via electromagnetic waves, and contains, among other things, a cassette 8 which accommodates chargeable batteries which serve for feed purposes.

This cassette 8 possesses externally accessible contact surfaces which, when the telephone 6 is inserted into the hollow 7, correspond to corresponding charging contacts 9, 10 which are provided on the base component 1.

The base component 1 also accommodates an elastic rib 11 which engages, by means of a nose 12, into a peripheral partition 13 at the edge of the cordless telephone 6 accommodated in the hollow 7 of the base component 1. In this way the telephone is pressed in the longitudinal direction against the charging contacts 9, 10 of the base component, and is safeguarded against unintentional detachment from the hollow, at right-angles to its longitudinal direction.

As part of the hollow 7 provided for the cordless telephone, an additional recess 14 is arranged in the base component 1. This additional recess is matched to the shape of the cassette 8 and a further, separate cassette 15 which contains chargeable batteries and corresponds to the shape of the cassette 8 is inserted therein. Here the contact surfaces of this cassette 15 correspond to charging contacts 16, 17 of the base component which are provided in the recess 14.

Although various minor changes and modifications might be proposed by those skilled in the art, it will be understood that we wish to include within the claims of the patent warranted hereon all such changes and modifications as reasonably come within our contribution to the art.

We claim as our invention:

1. A cordless telephone system, comprising:
   a base station means for communication with a location-independent cordless telephone;
   the base station means having a trough-like hollow having a shape matched or corresponding to that of the telephone;
   the cordless telephone having a cassette provided with a chargeable battery connected to feed power to the telephone;
   charging means in the base station means for charging the batteries when the telephone is inserted into the hollow;
   the base station means being provided with a trough-like recess means for accommodating a separate additional cassette with chargeable batteries having a shape the same as the cassette in the telephone, the recess means having a shape corresponding to contours of the separate cassette; and
   means associated with the troughlike recess means for charging the batteries in the cassette from the base station charging system.

2. A system according to claim 1 wherein the recess means for the additional cassette is designed as a part of the hollow which accommodates the telephone.

3. A system according to claim 1 wherein the base station means is provided with an elastic rib which abuts against a peripheral portion of the cordless telephone when it is inserted into the hollow of the base station means.

4. A system according to claim 3 wherein the elastic rib has a nose which engages into a peripheral partition of the cordless telephone.

5. A cordless telephone system, comprising:
   a base station having transmitting and receiving means for communicating with a location independent cordless telephone;
   the cordless telephone having a chargeable battery cassette detachably connected thereto so as to provide electrical power for operation of the cordless telephone;
   charging means associated with the base station for charging the cassette attached to the telephone when the telephone is resting on a surface at the base station;
   an additional chargeable battery cassette having a same shape as the battery cassette in the telephone; and
   means in said base station for receiving the additional cassette and making electrical contact therewith for charging the same when it is resting at the base station and such that it can be simultaneously charged while the cassette in the telephone is also being charged at the base station.

6. A system according to claim 5 wherein a trough-like hollow is provided at the base station within which the cordless telephone rests and beneath a floor portion of said hollow a recess is provided for receiving the additional cassette.

* * * * *